US008261642B2

(12) United States Patent
Brändström et al.

(10) Patent No.: US 8,261,642 B2
(45) Date of Patent: Sep. 11, 2012

(54) POWER WRENCH WITH REACTION BAR CONTROLLING MEANS

(75) Inventors: Roland Ulf Brändström, Sollentuna (SE); Thomas Jan Hanspers, Bromma (SE); Mikael Erik Monsell, Huddinge (SE)

(73) Assignee: Atlas Copco Tools AB, Nacka (SE)

( * ) Notice: Subject to any disclaimer, the term of this patent is extended or adjusted under 35 U.S.C. 154(b) by 331 days.

(21) Appl. No.: 12/738,184

(22) PCT Filed: Oct. 15, 2008

(86) PCT No.: PCT/SE2008/000598

§ 371 (c)(1),
(2), (4) Date: Apr. 15, 2010

(87) PCT Pub. No.: WO2009/051543

PCT Pub. Date: Apr. 23, 2009

(65) Prior Publication Data

US 2010/0229691 A1 Sep. 16, 2010

(30) Foreign Application Priority Data

Oct. 17, 2007 (SE) .................................. 0702315-3

(51) Int. Cl.
*B25B 23/151* (2006.01)
*B23Q 5/54* (2006.01)

(52) U.S. Cl. ........................................ 81/469; 173/181

(58) Field of Classification Search .................... 81/469, 81/479, 57.11, 57.31; 173/2, 20, 181, 183
See application file for complete search history.

(56) References Cited

U.S. PATENT DOCUMENTS

| | | | |
|---|---|---|---|
| 4,155,278 A | 5/1979 | Estok | |
| 4,462,282 A | 7/1984 | Biek | |
| 4,485,698 A | 12/1984 | Adman et al. | |
| 4,685,050 A * | 8/1987 | Polzer et al. | 700/32 |
| 6,161,629 A * | 12/2000 | Hohmann et al. | 173/181 |
| 6,289,770 B1 | 9/2001 | Collins | |
| 7,011,000 B2 * | 3/2006 | Kushida et al. | 81/302 |
| 7,021,179 B2 * | 4/2006 | Sittig et al. | 81/467 |
| 7,628,219 B2 * | 12/2009 | Frauhammer et al. | 173/18 |
| 7,757,587 B2 * | 7/2010 | Kaneyama et al. | 81/57.14 |
| 2005/0034276 A1 | 2/2005 | Badiali | |

OTHER PUBLICATIONS

English Language International Search Report dated Jan. 15, 2009 issued in parent Appln. No. PCT/SE2008/000598.

* cited by examiner

*Primary Examiner* — David B Thomas
(74) *Attorney, Agent, or Firm* — Holtz, Holtz, Goodman & Chick, PC

(57) ABSTRACT

A power wrench includes a housing divided into two parts which are rotatable relative to each other: a first part including a handle and a transverse section lodging a rotation motor, and a second part including a reduction gearing, an output shaft and a rigidly attached and laterally extending reaction bar. A swivel connection is provided between the housing parts and includes an angle sensor arranged to generate signals in response to relative angular movements between the housing parts, and a power control unit communicates with the angle sensor and is arranged to at least substantially reduce the motor power as a pre-set maximum angular movement between the housing parts is exceeded as the motor is started.

7 Claims, 2 Drawing Sheets

POWER WRENCH WITH REACTION BAR CONTROLLING MEANS

This application is a U.S. National Phase Application under 35 USC 371 of International Application PCT/SE2008/000598 filed Oct. 15, 2008.

The invention relates to a portable power wrench with a housing consisting of two parts which are swivelled relative to each other, wherein a first part comprises a handle and a rotation motor, and a second part comprises a reduction gearing and a laterally extending reaction bar for transferring a reaction torque from the second housing part to a stationary reaction torque supporting object.

Power wrenches of this type, as described in for instance U.S. Pat. No. 4,485,698, are used for tightening rather big screw joints with high torque level requirements. Therefore, the housing is divided into a rear part with the drive motor and a handle for the operator, and a forward part with a reduction gearing and a laterally extending reaction bar for transferring reaction torque from the forward housing part to a stationary object forming a reaction torque support. The swivel connection between the housing parts and the reaction bar prevents the operator from being exposed to heavy reaction torque loads transferred to the forward housing part via the reduction gearing and enables at the same time the handle to be freely positioned for a comfortable handling of the power wrench notwithstanding the direction of the reaction bar.

However, there is a problem and a potential risk for the operator to get hurt should the reaction bar not be in proper contact with the stationary object as the power wrench starts delivering a tightening or loosening torque to a screw joint. In such cases the reaction bar may perform a swinging movement to find its stationary support object. Such a movement could be hazardous to the operator since there is an obvious risk that he might get hurt by the swinging reaction bar. Even if the swinging movement of the reaction support bar is rather short there is a risk for the operator to get jammed between the reaction bar and the stationary object.

It is an object of the invention to provide an improved power wrench wherein a means is provided to substantially reduce the risk for injuries and damages to people and equipment by controlling the swivelling movement between the housing parts and, hence, the rotation movement of the reaction bar.

Further objects and advantages of the invention will appear from the following specification and claims.

A preferred embodiment of the invention is described in detail below with reference to the accompanying drawing.

Figure 1:
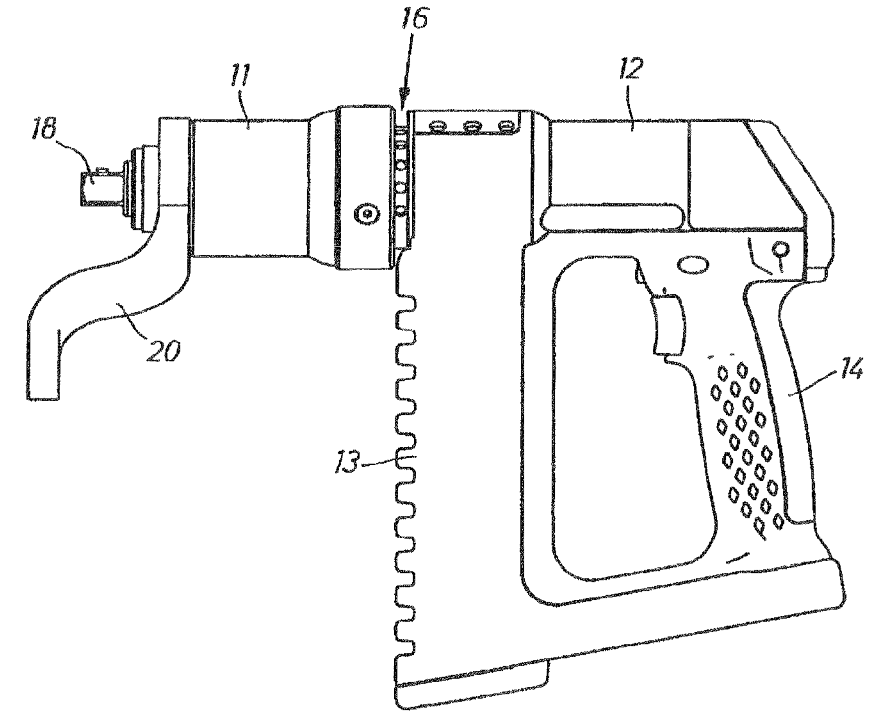
FIG. 1 shows a side view of a power wrench according to the invention.

The power wrench illustrated in the drawing figures comprises a housing 10 divided into two parts, namely a forward part 11 and a rear part 12. The rear part 12 includes a transverse section 13 enclosing a rotation motor and a mechanical power transmission (not illustrated), a handle 14 for manual support of the wrench and an electronic control unit for controlling the power supply to the motor. In the interface between the forward part 11 and the rear part 12 of the housing 10 there is a swivel connection 16 including a ball bearing 17. This means that the forward part 11 is rotatable relative to the rear part 12.

The forward housing part 11 comprises a reduction gearing in two or more stages for multiplying the torque delivered by the motor to an output shaft 18. The latter is adapted to carry a nut socket. The forward housing part 11 also carries a rigidly attached reaction bar 20 which extends laterally from the housing and is intended to take support against a suitable stationary object A for transferring the reaction torque induced in the forward part 11 of the housing 10 during torque deliverance via the output shaft 18. See FIG. 2. Accordingly, the swivel connection 16 between the two housing parts 11 and 12 in combination with the reaction bar 20 aims to prevent reaction torque from reaching the rear part 12 of the housing 10 and the operator via the handle 14. The swivel connection 16 between the two housing parts 11,12 also means that the handle 14 could be maintained in a position suitable for comfortable handling of the power wrench, notwithstanding the angular position of the reaction bar 20.

The rear housing part 12 includes a rigidly attached bearing ring 21 with an external ball race 22 for supporting a number of bearing balls 23. The forward housing part 11 comprises a corresponding internal ball race 24 and forms together with the balls 23 and the ball race 22 the ball bearing 17.

In the interface between the rear and forward housing parts 11, 12 there is provided a rotation sensing means in the form of an activation unit 25-27 and a sensor 30. The activation unit 25-27 comprises an activation element 25 with a magnet 26 movably supported on the bearing ring 21, and a ball 27. The activation element 25 and the ball 27 are biased by a spring 28 to make the ball 27 engage either one of a peripheral row of indentations 29 in the forward housing part 11. The activation unit 25-27 is caused to move radially as the forward housing part 11 is rotated relative to the rear housing part 12 in that the ball 27 is forced to "jump" from one indentation 29 to the next. The indentations 29 act as a cam means to accomplish these radial movements of the activation unit 25-27. The magnet 26 of the activation element 25 co-operates with a Hall-type sensor 30 located on a printed circuit board 31, whereby the sensor 30 is arranged to accomplish electric signals at radial movement of the activation element 25 corresponding to a relative rotation between the two housing parts 11,12.

The rear housing part 12 is also provided with two more spring biased position retaining balls 34,35 arranged to co-operate with the row of indentations 29 equally distributed along the periphery of the forward housing part 11. The purpose of these two balls 34,35 is to restrain free rotation of the housing parts 11,12 relative to each other and to retain the housing parts in desired relative positions at handling of the wrench.

The non-illustrated electronic control unit in the rear housing part 12 communicates with the sensor 30 and is programmed to shut off or at least substantially reduce the motor power in case the sensor 30 indicates more than a predetermined relative rotation between the housing parts 11,12 after the motor has started rotating. In the described embodiment the relative rotation limit could be fifteen, thirty, forty-five etc. degrees, i.e. a multiple of fifteen degrees, because the number of indentations in the forward housing part 11 is twenty-four. This means that the number of alternative relative positions of the housing parts 11,12 is also twenty-four, and that the angular distance between these positions is fifteen degrees. This is the shortest angular displacement $\alpha$ of the reaction bar 20 before a motor power reduction can be obtained in case the reaction bar 20 is out of contact with a stationary support object. This means that the angle $\alpha$ to be covered by the reaction bar 20 before it gets into contact with a stationary support object is fifteen degrees before the activation unit 25-27 initiates a motor power reduction or shut-off. In most cases this is acceptable and not considered hazardous to the operator. In some applications thirty or even forty-five degrees are acceptable.

Figure 2:
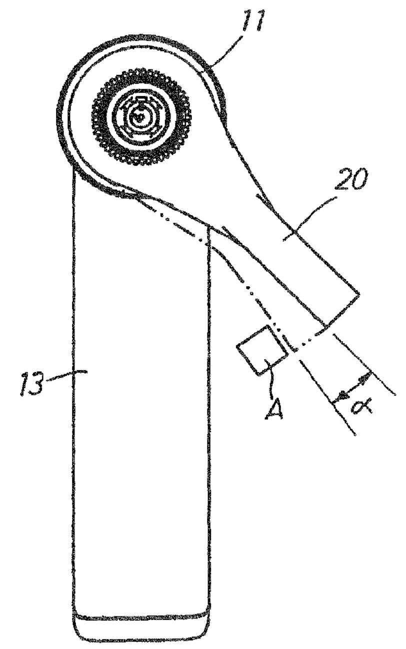
FIG. 2 shows a front end view of the power wrench in FIG. 1 illustrating the reaction bar in relation to a stationary object.
Figure 3:
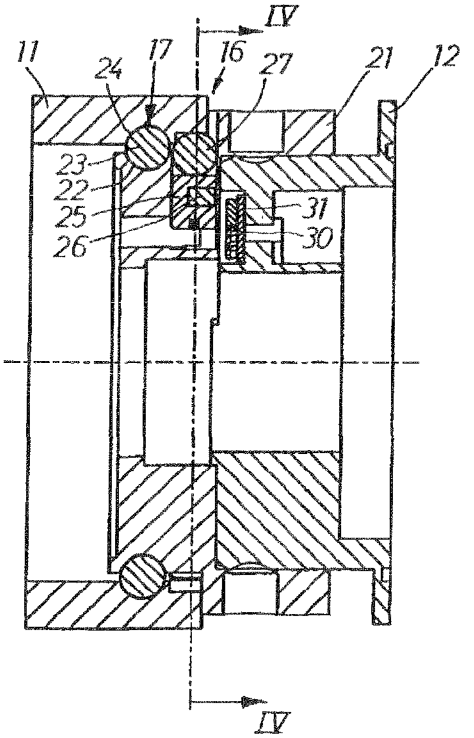
FIG. 3 shows on a larger scale a longitudinal section, as along line in FIG. 4, through the swivel connection between the housing parts.
Figure 4:
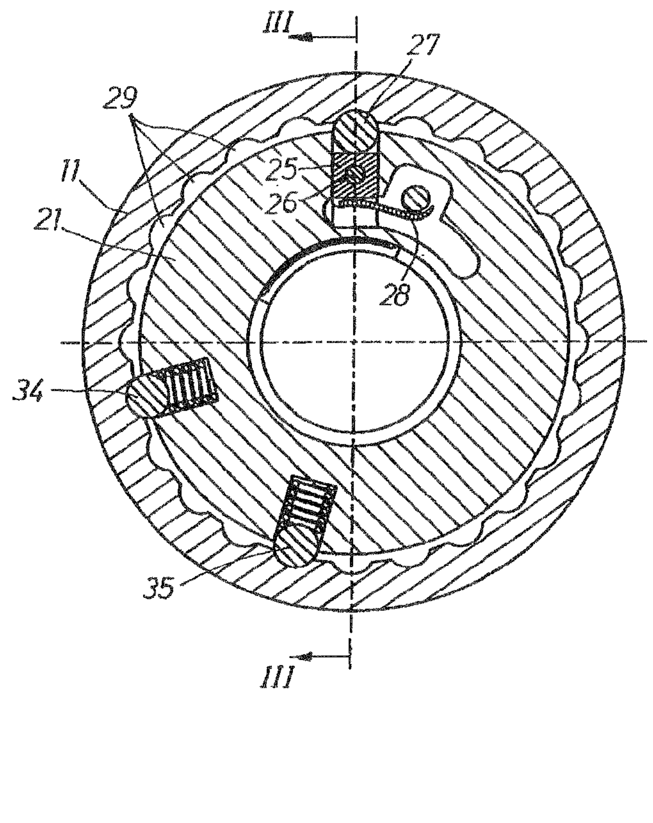
FIG. 4 shows a cross section, as along line IV-IV in FIG. 3, through the power wrench at the swivel connection.

The described device provides a safety means for the operator to prevent injuries when starting a tightening operation of a screw joint, because the reaction bar may not be accurately positioned as the motor is started and a sudden rotation movement of the reaction bar might be the result. In FIG. 2 there is illustrated that the reaction bar 20 has to be moved an angle α before it takes support against the stationary support object A. The illustrated angle α is quite small and the control unit could be set not to reduce the motor power at such a small angle at the start of tightening operation.

The invention also aims to prevent damages and injuries to the operator should the power wrench unintentionally be set to rotate in the loosening direction of the screw joint. That would result in a total lack of stationary support for the reaction bar 20 and a substantial swinging movement of the reaction bar 20. This could be very hazardous to the operator and is effectively prevented by the device according to the invention.

It is to be noticed that the embodiments of the invention are not limited to the described example but can be freely varied within the scope of the claims. For example, the reaction bar may have different designs since it has to be individually designed to adapt to the actual application.

Neither is the invention limited to the described rotation sensing means including the indentations and the radially movable activation unit but may as well comprise other types of movement detecting devices, for instance a magnetised ring fitted to one of the housing parts and a sensor carried by the other housing part. Such a ring could be magnetised in a great number of transverse bands such that very small rotation increments could be indicated. That would increase the possibility to more freely choose the acceptable rotation angle of the reaction bar 20 at the start of the power wrench motor. As a compliment to such a contact-free sensing means there should be employed some sort of braking device to prevent free relative rotation between the housing parts at handling of the power wrench before and after each screw tightening operation.

The invention claimed is:

1. A power wrench comprising:

a housing with a first part containing a rotation motor and a handle for manual support of the wrench, a second part containing a reduction gearing, and an output shaft, a swivel connection between said first part and said second part, and a laterally extending reaction bar rigidly secured to said second part and intended to take support against a stationary object (A), wherein an angle sensing means is provided at said swivel connection and arranged to deliver signals in response to angular movements between the first part and the second part, and a power control unit is connected to the motor and to said angle sensing means, and wherein said power control unit is arranged to at least substantially reduce the power supply to the motor as a preset maximum angular movement (α) between the first and second housing parts is exceeded as the motor is started.

2. The power wrench according to claim 1, wherein said angle sensing means comprises an activation unit, a cam means located between the parts and arranged to move the activation unit at relative rotation of the parts, and a sensor activated by said activating unit and generating signals in response to the movement of the activating unit.

3. The power wrench according to claim 1, wherein said activation unit comprises a magnet, and said sensor comprises a Hall-type sensor activated by said magnet at movement of the activating unit.

4. The power wrench according to claim 2, wherein said cam means comprises a peripheral row of indentations in one of the housing parts, and a ball supported on the other housing part for engaging said indentations and forming a part of the activation unit.

5. The power wrench according to claim 4, wherein at least one spring biased ball is arranged on one housing part for co-operating with said row of indentations on the other housing part to form a rotation braking means between the housing parts.

6. The power wrench according to claim 2, wherein said activation unit comprises a magnet, and said sensor comprises a Hall-type sensor activated by said magnet at movement of the activating unit.

7. The power wrench according to claim 3, wherein said cam means comprises a peripheral row of indentations in one of the housing parts, and a ball supported on the other housing part for engaging said indentations and forming a part of the activation unit.

* * * * *